April 30, 1940.    P. P. METZ    2,199,110

DILUTION OF LIQUID CHEMICAL COMPOUNDS

Filed Nov. 23, 1937    3 Sheets—Sheet 1

INVENTOR.
Peter P. Metz
BY
ATTORNEYS.

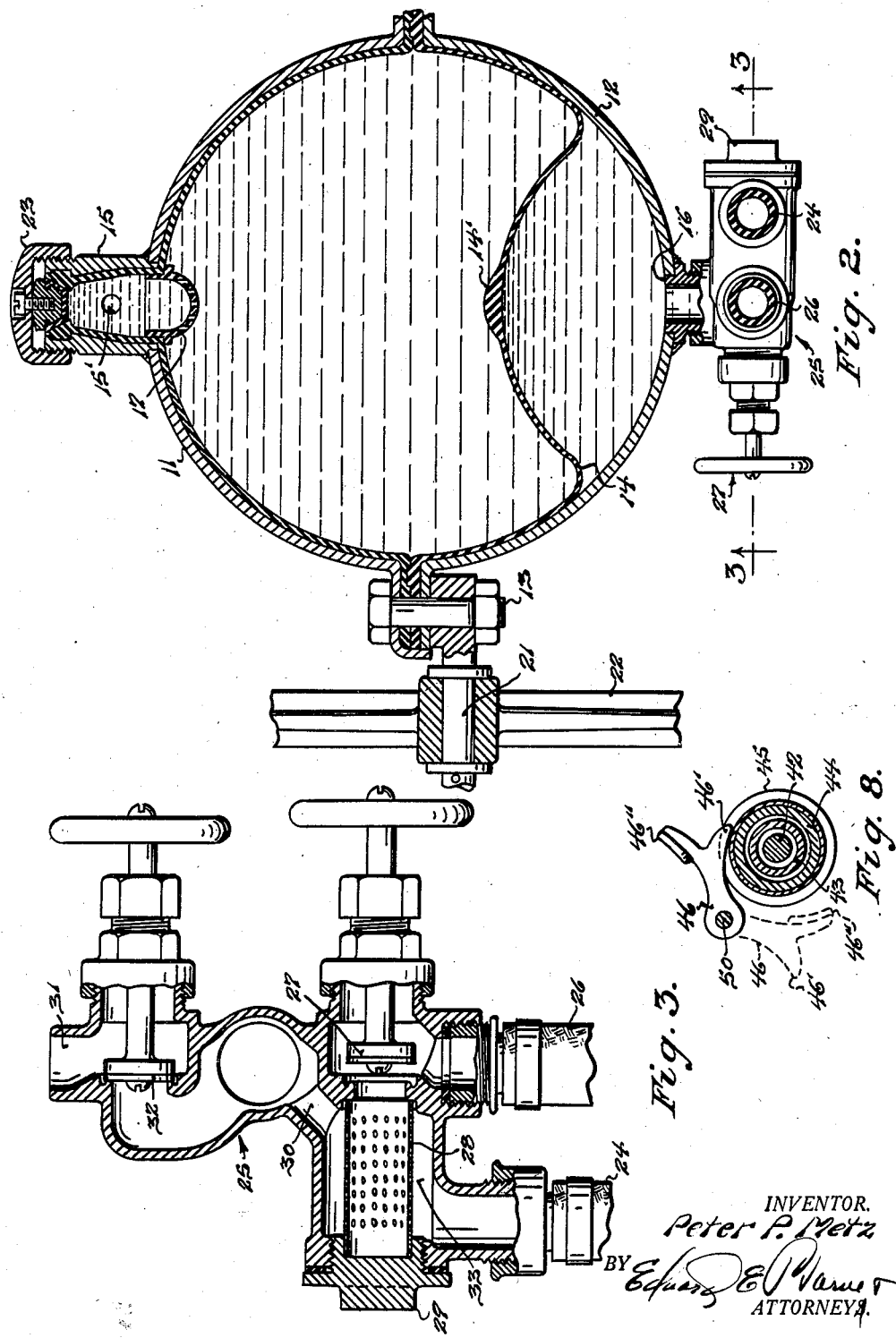

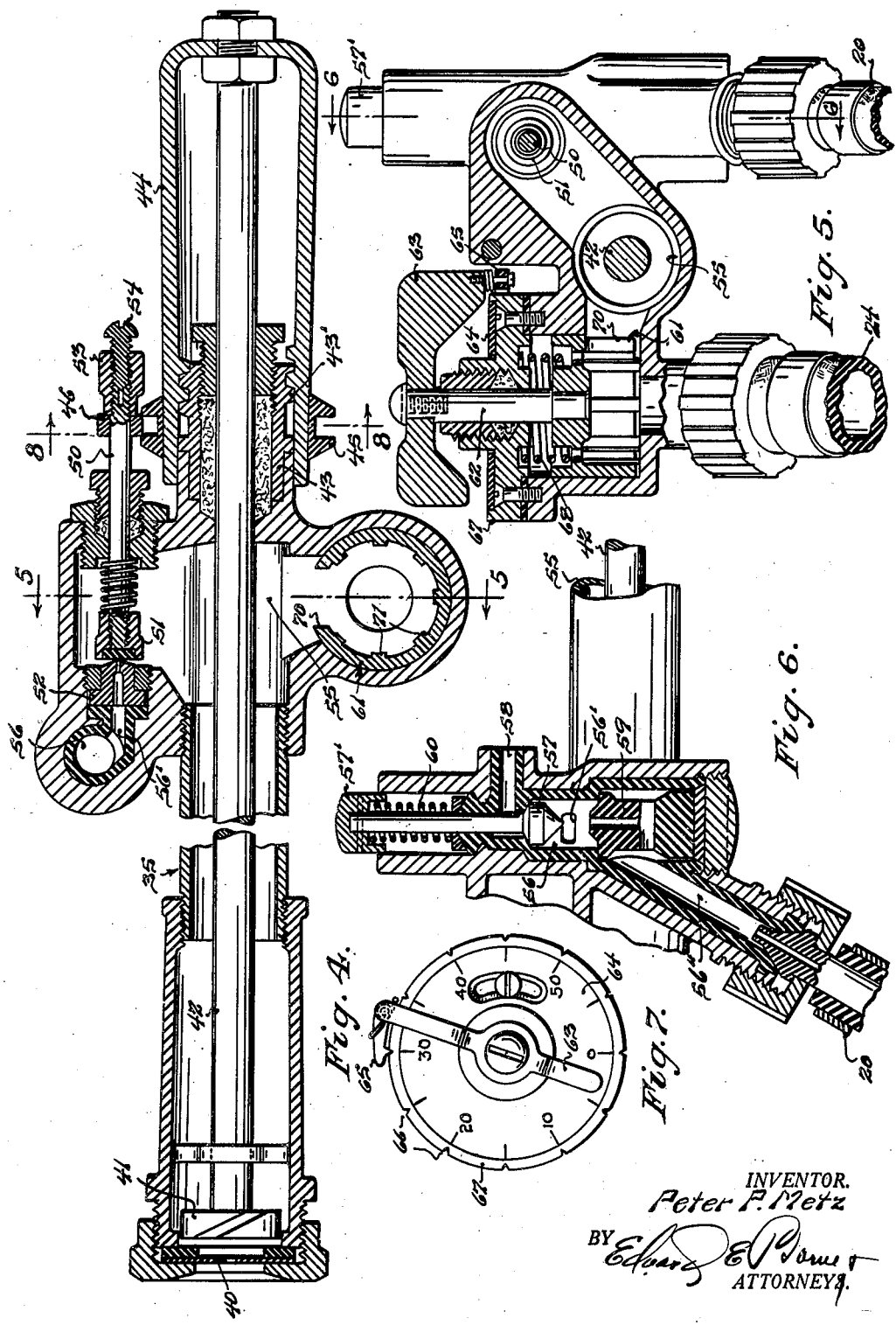

Patented Apr. 30, 1940

2,199,110

UNITED STATES PATENT OFFICE 2,199,110

DILUTION OF LIQUID CHEMICAL COMPOUNDS

Peter P. Metz, Seattle, Wash.

Application November 23, 1937, Serial No. 176,043

8 Claims. (Cl. 299—85)

This invention relates to spraying machines of the general character illustrated and described in pending applications filed jointly by myself and Clarence O. Dailey in the United States Patent Office March 14, 1936 and June 23, 1937, Ser. Nos. 68,816 and 149,922.

The objectives of the present invention are to provide improved storage accommodations for the chemical concentrate, to provide improvements in the construction of the spray nozzle and the control devices by which water and chemical ratios are governed, and otherwise generally to provide advancements over the spray mechanisms which heretofore have been available, objects which will become apparent during the course of the following detailed description and the claims annexed thereto.

The invention consists in the novel construction, adaptation, and combination of parts hereinafter described and claimed.

In the drawings:

Fig. 2 is an enlarged transverse vertical section representing the tank in its inverted filling position, the section being taken on line 2—2 of Fig. 1.

Fig. 3 is a still further enlarged detail horizontal section taken on the line 3—3 of Fig. 2.

Figure 1:
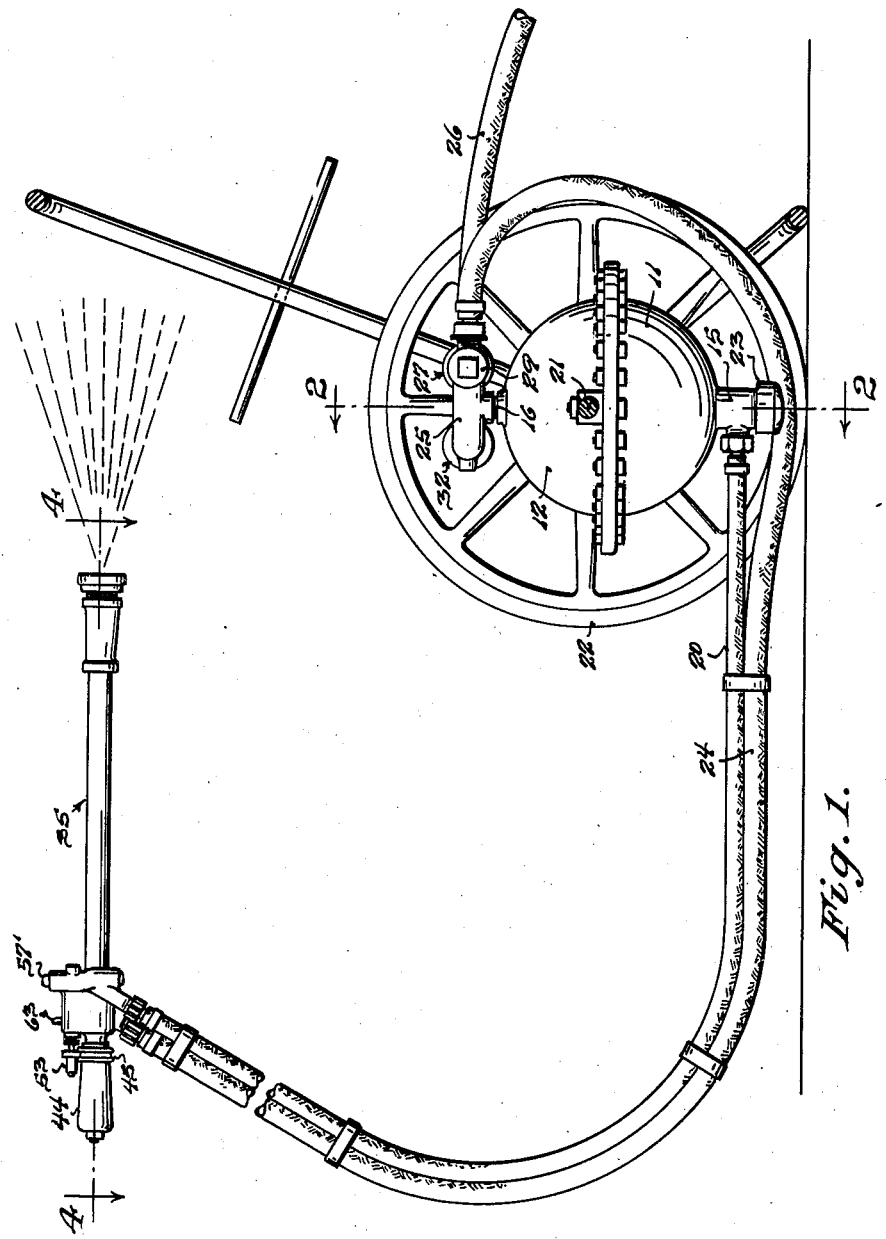
Figure 1 is a side elevational view illustrating a spraying machine constructed according to the advanced teachings of the present invention, the view having the near wheel of the tank carriage deleted and the supporting axle therefor shown in vertical section.

Figs. 4, 5 and 6 are sectional views detailing the spray head and mixture-controlling valve devices associated therewith, the views being taken on the respective section lines 4—4 of Fig. 1, 5—5 of Fig. 4, and 6—6 of Fig. 5;

Fig. 7 represents, in plan, a detail view of the mixture-control handle and related graduations by which the operator is enabled to set the machine for a desired spray mixture; and Fig. 8 is a transverse vertical section taken on the line 8—8 of Fig. 4 to show in detail the manually-controlled clutch mechanism which I employ to obtain either clear water or diluted chemical in response to an opening of the spray nozzle.

The present invention, as with the prior sprayer developments to which I have referred, employs the pressure of a source of water supply as the motivating force for delivering water-soluble liquid chemical from a compressible receptacle into mixing relation with a body of diluting water flowing in a confined stream from the source.

In the present assembly the receptacle for the chemical comprises a spherical tank composed of complementary flanged bell-members 11 and 12 boltably interconnected as at 13 and receiving, between the coupled flanges, a tendinous sack-forming partition 14 of rubber or other like or suitable material, the chemical being introduced to one side of the sack through a filler opening formed in a boss 15 integral with the bell-member 11 and the water by which pressure is applied for compression purposes being supplied to the opposite side of the sack through a nipple 16 carried by the bell-member 12. A lateral discharge duct 15' provided by the boss receives a flexible chemical-feed hose 20 and interposed between this duct and the reservoir chamber of the tank is a screen 17. A stiffening nub 14' formed centrally of the partition member prevents the screen perforations from becoming invested as the chemical is discharged.

For portability and easy inversion of the tank from the filling position of Fig. 2 at which the boss lies uppermost to the operating position of Fig. 1, the tank is mounted on a wheeled carriage of which the supporting axles 21 for the wheels 22 are offset from the center of gravity.

Said chemical-feed hose 20 is complemented by a water-feed hose 24, the two being coupled for convenience in handling and at their outlet ends connecting with the spray head of the machine. I represent by 25 a valve body fitting the tank nipple 16 and acting to connect the tank and said nose 24 with a nose 26 leading from a pressure source of water supply, the connection between said hoses within the valve body comprising a valved flow passage 33 and branch ducts therefrom to the hose 24 and to the nipple 16, which latter duct, indicated by 30, carries to a valved port 31 leading to the atmosphere and serving the end of a pressure release essential to a re-filling of the chemical receptacle. The valve for said port 31 is represented by 32.

The spray head to which hoses 20 and 24 lead is provided with a mixing chamber common thereto and I indicate said mixing chamber, denoted by 55, as having a relatively unobstructed run through an elongated hollow barrel 35 to an adjustable rose carried terminally of the same, a rose constituted of a centrally apertured jetplate 40 and an associated spray-governing disk 41 supported by a rod 42 for movement axially of the barrel. The rod, received through a suitable packing box assembly, projects rearwardly from the barrel where connection is had with a rotary control sleeve 44 having internal threads en-

volumetric delivery of water to the mixing chamber, a control by which the spray nozzle is opened to permit a discharge of the spray therefrom, and means operatively associated with said discharge control for opening the mixing chamber to the chemical in the chemical conduit only in response to an opening of the spray nozzle.

3. Spraying apparatus comprising, in combination, a spray head providing a mixing chamber and a spray nozzle in communication therewith, a remotely disposed pressure tank for the spray head providing a compressible receptacle for chemical concentrate, connection from a pressure source of water supply to the interior of the tank for applying compression pressure to the receptacle, a fitting for said pressure tank providing a valved atmospheric exhaust permitting the pressure to be relieved on the compressible receptacle by a discharge of the water from the tank, flexible extended conduits leading independently from the tank to connect the interior or chemical side of the receptacle with the mixing chamber of the spray head and to connect the exterior or water side of the receptacle with the mixing chamber of the spray head, and valve devices carried by the spray head for governing ratio as between chemical and water delivered to the mixing chamber and for adjusting the nozzle to control the physical nature of the delivered spray.

4. In a spraying machine, a spray head comprising a tube supporting a centrally apertured rose at the delivery end of the same, a disk associated with the rose and supported for movement axially of the tube for governing the physical nature of the delivered spray, a supporting rod for the disk, said rod projecting rearwardly from the tube, a disk-regulating sleeve threadably supported on the rear end of the tube and engaging the rod for imparting axial movement to the rod, and means carried by the head to govern the flow of the spray thereto movable coincident with the axial movement of the rod.

5. Dilution mechanism for water-soluble liquid concentrates comprising, in combination with a pressure tank providing a compressible receptacle for the concentrate, a discharge head separate from the tank formed with a mixing chamber having independent concentrate-admission and water-admission ports to the same, valves for controlling the admission of concentrate and water through said ports, a metering plug of fixed volumetric capacity for said concentrate-admission port complementing the valve therefor, a fitting for the tank by which to supply water from a pressure source of water supply into compressing relation to the concentrate receptacle, a fitting for the tank by which to deliver the concentrate ejected under the compression pressure of the admitted water, a flexible hose from said last-named fitting leading to the concentrate-admission port of the mixing chamber for delivering the ejected concentrate to the mixing chamber, a flexible hose from said first-named fitting leading to the water-admission port of the mixing chamber for delivering water under the pressure influence of the source of supply to the mixing chamber, and a valve in said first-named fitting functioning to control the flow of water from the fitting to the hose leading therefrom.

6. Spray mechanism comprising, in combination, a pressure tank providing a compressible receptacle for a chemical and fittings by which to supply water from a pressure source of supply and to deliver the chemical under the compression pressure of the water, a discharge head disposed in remote relation to the pressure tank providing a mixing chamber having chemical-admission and water-admission ports to and a discharge port from the same, independent connections from the chemical-delivery fitting of the pressure tank to the chemical-admission port of the discharge head and from the water-supply fitting of the pressure tank to the water-admission port of the discharge head, a control carried by the discharge head for regulating the physical nature of the spray delivered from the head, and a control operating in unison with the opening and closing of said regulating control for opening and closing, in the respective instance, the chemical-admission port of the head, the chemical admitted through said port remaining constant as to volume during spray-changing movements of the regulating control.

7. In a machine for diluting liquid chemicals, a pressure tank, a compressible sack in said tank operating as a receptacle for the chemical, a mixing chamber having an admission port thereto connected with the interior of the chemical receptacle, means for connecting both the mixing chamber and the pressure tank with a pressure source of water supply, a valved opening leading from the mixing chamber, manually controlled devices normally operating in unison to open and close the chemical-admission port simultaneously with an opening and closing of the outlet from the mixing chamber, and means associated with said devices manually controlled to permit the outlet from the mixing chamber to be opened independently of the chemical-admission port for obtaining a straight-water discharge from the mixing chamber.

8. In a machine using the static pressure of a pressure source of a diluting agent to feed a liquid chemical concentrate, in governed ratio, into a stream of the agent flowing from said source, a pressure receptacle formed from complementary flanged bell-members boltably interconnected to form a substantially spherical tank, a membranous partition received in said tank to divide the tank and provide a compressible reservoir for the chemical concentrate on one side of the partition and an expansible chamber for a pressure body of the diluting agent on the other side thereof, said partition being marginally secured between the bolted flanges of the tank and being shaped to normally conform to the inner-wall contour of the bell members and thereby eliminate any resistance by the partition to its inversion under the application of compression pressure from the pressure body of diluting agent in the expansible chamber, a mixing chamber, a conduit leading from the reservoir side of the pressure tank to the mixing chamber, and conduits arranged to connect the pressure source of the diluting agent with the other side of the pressure tank and also with the mixing chamber.

PETER P. METZ.